United States Patent
Kula et al.

(10) Patent No.: US 8,894,119 B1
(45) Date of Patent: Nov. 25, 2014

(54) BONDED VEHICLE SENSOR ASSEMBLY

(71) Applicant: Ford Global Technologies, LLC, Dearborn, MI (US)

(72) Inventors: Paul Kevin Kula, Farmington Hills, MI (US); Steven Yellin Schondorf, Dearborn, MI (US); Yeruva Satya Reddy, Farmington, MI (US); Erich Kemnitz, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/916,118

(22) Filed: Jun. 12, 2013

(51) Int. Cl.
 *B60R 19/48* (2006.01)
 *B60R 21/0136* (2006.01)

(52) U.S. Cl.
 CPC ........... *B60R 19/483* (2013.01); *B60R 21/0136* (2013.01)
 USPC ..................... 296/1.04; 296/187.03; 293/117; 342/27; 342/70

(58) Field of Classification Search
 CPC ...... B60R 19/02; B60R 19/023; B60R 19/48; B60R 19/483; B60R 21/013; B60R 21/0134; B60R 21/34
 USPC ............ 293/117, 120, 121; 296/1.04, 187.03, 296/187.04, 187.09; 342/27, 28, 70
 See application file for complete search history.

(56) References Cited

U.S. PATENT DOCUMENTS

| | | | |
|---|---|---|---|
| 6,203,366 B1 | 3/2001 | Muller et al. | |
| 6,279,210 B1* | 8/2001 | Faass et al. | ..................... 24/457 |
| 6,318,774 B1* | 11/2001 | Karr et al. | ..................... 293/117 |
| 7,303,041 B2* | 12/2007 | Stuve | ............................. 180/274 |
| 7,753,419 B2* | 7/2010 | Kondo | ............................ 293/117 |
| 7,784,855 B2* | 8/2010 | Faass et al. | .............. 296/187.01 |
| 2005/0154530 A1* | 7/2005 | Hosokawa et al. | ........... 701/301 |
| 2006/0232081 A1* | 10/2006 | Sato et al. | ...................... 293/117 |
| 2006/0267359 A1* | 11/2006 | Blake | ............................ 293/120 |
| 2011/0043344 A1* | 2/2011 | Nichols et al. | ................ 340/436 |
| 2013/0250732 A1* | 9/2013 | Tsuji et al. | ..................... 367/173 |

FOREIGN PATENT DOCUMENTS

| | | |
|---|---|---|
| DE | 20010478 U1 | 10/2000 |
| DE | 20118265 U1 | 1/2001 |
| DE | 102010049818 A1 | 5/2012 |
| FR | 2809691 A1 | 12/2001 |
| FR | 2978400 A1 | 2/2013 |
| JP | 2009514735 A | 4/2009 |
| WO | WO2013114466 A1 * | 8/2013 |

OTHER PUBLICATIONS

Japanese to English translation of WO 2013/114466 A1, retreived from the WIPO website translation service on Jul. 9, 2014.*

* cited by examiner

*Primary Examiner* — Glenn Dayoan
*Assistant Examiner* — Jason S Daniels
(74) *Attorney, Agent, or Firm* — Frank A. MacKenzie; Brooks Kushman P.C.

(57) ABSTRACT

An automotive vehicle fascia assembly is provided. The fascia assembly includes a bumper cover and an impact sensor assembly attached to, without mechanically fastening, the bumper cover. The impact sensor assembly includes a housing, a sensor disposed within the housing, and a planar tab bonded to the bumper cover. The impact sensor assembly is spaced away from the bumper cover a distance no greater than a thickness of the planar tab.

19 Claims, 4 Drawing Sheets

BONDED VEHICLE SENSOR ASSEMBLY

TECHNICAL FIELD

This disclosure relates to the attachment of sensors to vehicle components.

BACKGROUND

Automotive vehicles include environment awareness capabilities which may improve vehicle performance and vehicle safety features. Consumer appetites and automotive regulations further push demand for improvements in these environment awareness capabilities. Structural vehicle features and sensor system features may obtain information on a surrounding environment and direct vehicle responses related to the obtained information. On-board vehicle systems may obtain different types of information from different locations on the vehicle. These vehicle systems may include sensors and sensor systems to assist in obtaining the information. A position and/or location of these sensors on-vehicle typically play a role in the operation of the sensor and sensor systems. Additionally, these sensor systems may be designed to facilitate efficient installation and/or assembly processes.

SUMMARY

A vehicle includes a bumper beam, a bumper cover and an impact sensor assembly disposed between the bumper beam and bumper cover. The impact sensor assembly includes a housing, an impact sensor within the housing, and a planar tab. The planar tab is bonded to the bumper cover such that a minimum distance between the bumper beam and the impact sensor assembly is at least seventy millimeters. The planar tab may be a plastic strip. The planar tab may be embedded within the housing or the planar tab may extend from the housing. The planar tab may be adhesively bonded or ultrasonically welded to the bumper cover. The planar tab may be between one and three millimeters thick. The planar tab may be a material which is the same as a material of the bumper cover.

A vehicle fascia assembly includes a bumper cover and an impact sensor assembly. The impact sensor assembly is attached to, without mechanically fastening, the bumper cover. The impact sensor assembly includes a housing, a sensor within the housing and a planar tab ultrasonically welded to the bumper cover. The housing is spaced away from the bumper cover a distance no greater than a thickness of the planar tab. The planar tab may be a plastic strip. The planar tab may be embedded within the housing or may extend from the housing. The planar tab may be between one and three millimeters thick. The planar tab may be a material which is the same as a material of the bumper cover.

A vehicle includes a bumper beam and a bumper cover with an inner surface and an outer surface. The bumper beam and inner surface at least partially define a cavity. A sensor assembly is disposed within the cavity. The sensor assembly includes a sensor, a housing and a planar tab. The planar tab is attached to the inner surface and has a thickness such that when ultrasonically welded to the inner surface, the thickness of the planar tab does not cause deformation of the outer surface of the bumper cover proximate to the planar tab. The planar tab may be a plastic strip. The planar tab may be embedded within the housing or may extend from the housing. The planar tab may be a material which is the same as a material of the bumper cover.

DETAILED DESCRIPTION

Figure 1:
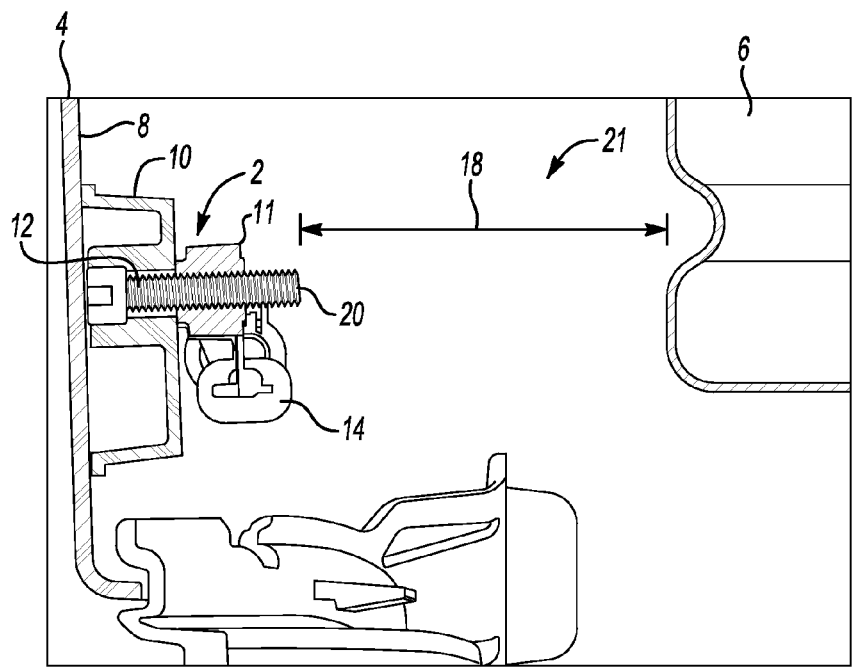
FIG. 1 is a side view, in cross-section, of a sensor assembly attached to a bumper cover via a stud, nut and bracket.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles typically include multiple safety features which may utilize structural features and/or sensor system features. These features may assist in protecting vehicle occupants, the vehicle itself and surrounding obstacles/objects/pedestrians. Vehicle energy absorbers and bumper beams may be two examples of structural safety features. Structural safety features may be coupled with sensor system safety features to warn and/or alert a driver under certain circumstances, such as when the vehicle nears an object. One example of a sensor system is a vehicle parking aid system which may include a sensor to detect objects and a capability to sound an alert in response to object detection. As such, the parking aid system may alert the driver if, for example, the vehicle is nearing an object when backing into a parking space.

Vehicles may also seek to utilize structural and sensor system safety features to provide additional protection for pedestrians and/or to reduce pedestrian injury resulting from an impact with the vehicle. Sensor systems may detect an object upon impact and activate a vehicle response. Certain sensors, such as impact sensors, may further determine the type of object impacting the vehicle and send a corresponding signal to a safety system to activate the vehicle response. In addition to sensor system capabilities, the locations, positions and method of mounting these sensors and sensor system features often coincide with proximate vehicle structural features to provide desired performance.

For example, impact sensors may be positioned in an area between a vehicle's fascia and a vehicle's bumper beam. A bumper cover portion of the vehicle's fascia is one example of this type of area. Vehicle fascias typically include an A-surface and a B-surface. The A-surface is a portion of the fascia facing "outward" and/or facing "off vehicle" (the surface typically seen by pedestrians and other motorists). The B-surface is a portion of the fascia facing "inward" (the surface typically not seen by pedestrians and other motorists.) The B-surface of a bumper cover typically faces the bumper beam and/or an energy absorber. Current automotive applications for securing and/or positioning a sensor assembly at or near a fascia B-surface utilize a plastic assembly with a weld stud attached thereto. The plastic assembly is typically heat staked or welded to the B-surface. The sensor is then mechanically attached to the weld stud with a nut. The stud, however, is a hard point of contact extending toward the bumper beam which may be undesirable as described below.

Referring now to FIG. 1, an impact sensor assembly 2 is attached to a vehicle bumper cover 4 as known in the art. The sensor assembly 2 is mounted to a B-surface 8 of the bumper cover 4. The sensor assembly 2 includes a plastic bracket 10 with a stud 12 and a nut 11 to facilitate mounting an impact sensor 14 to the B-surface 8. Dimension 18 is a distance between an end 20 of the stud 12 and a bumper beam 6 within an area 21. The end 20 is an example of hard point of contact. Automotive safety standards may provide guidance on appropriate minimum distances between a hard point of contact and a bumper beam or a sensor assembly and the bumper beam, referred to herein as a crush distance. Automotive manufacturers may also have internal standards relating to the crush distance.

For example, an impact at or near the sensor assembly 2 on bumper cover 4 may direct the stud 12 and nut 11 toward the bumper beam 6. If the end 20 bottoms out against the bumper beam 6, the sensor 14 may cease operating due to damage and/or destruction. In terms of sensor performance, an impact where the crush distance is too short may render the sensor 14 inoperable prior to completion of its tasks. In contrast, a larger crush distance may provide more time for the sensor 14 to operate following an impact. Therefore, it may be desirable to minimize and/or eliminate elements of sensor assemblies within the area 21 to maximize the crush distance. For example, a horizontal dimension of the plastic bracket 10 may contribute to a shorter crush distance since the nut 11 and stud 12 are needed to mechanically fasten the sensor 14 to the bumper cover 4. Additional safety requirements, such as a preferred number of stud 12 threads clearing the nut 11, may also contribute to a shorter crush distance. Eliminating the plastic bracket 10, nut 11 and stud 12 may result in a larger crush distance and one less hard contact point in the area 21.

Figure 2:
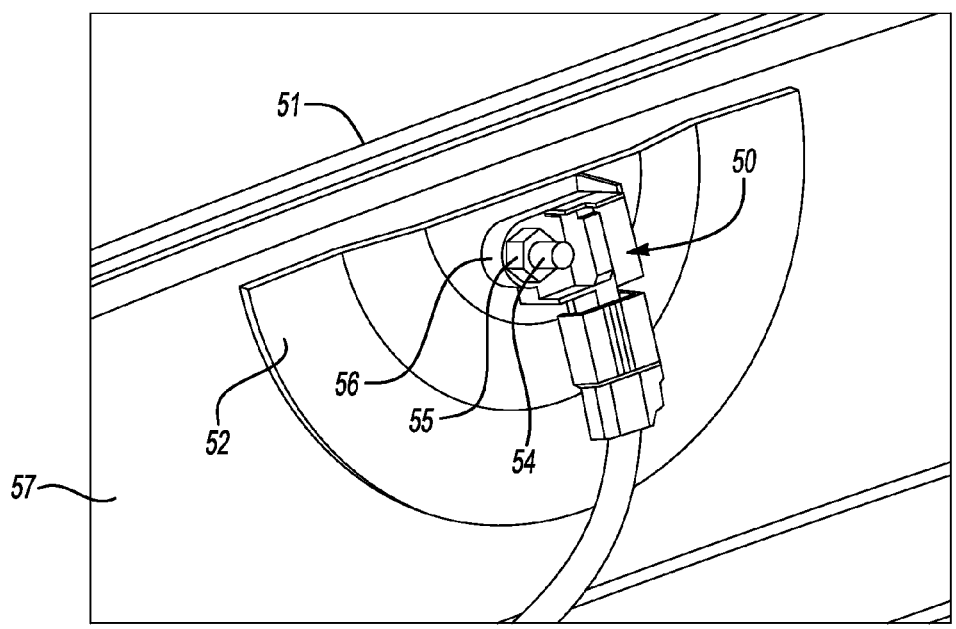
FIG. 2 is a perspective view of a sensor assembly mechanically fastened to a bumper cover via a stud, nut and bracket.
Figure 3:
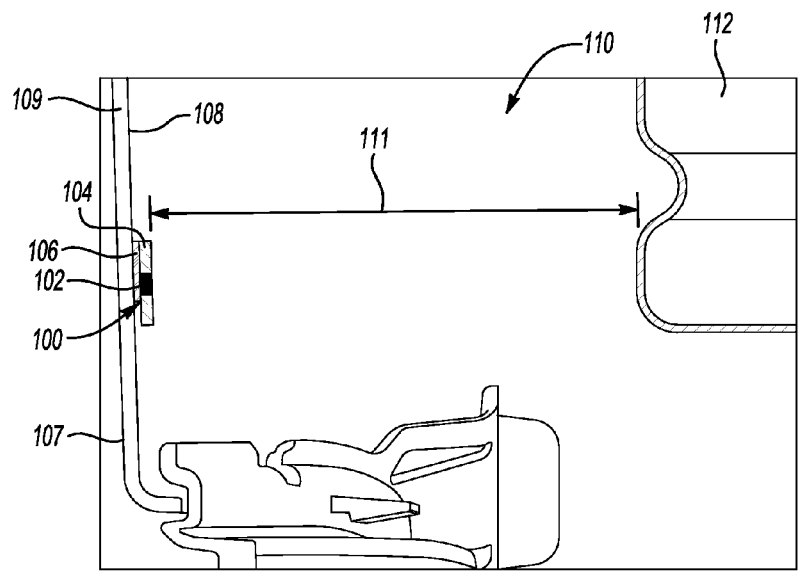
FIG. 3 is a side view, in cross-section, of a sensor assembly attached to a bumper cover.

Now referring to FIG. 2, a sensor assembly 50 is attached to a vehicle fascia 51 as known in the art. Similar to sensor assembly 2, the sensor assembly 50 is mechanically attached to a bracket 52 via a stud 54, a nut 55 and a bushing 56. The bracket 52 is attached to a fascia B-surface 57 and the stud 54 extends toward a bumper beam (not shown). As with sensor assembly 2, a bracket, stud and nut combination such as bracket 52, stud 54 and nut 55 may influence a shorter and less desirable crush distance.

In addition to crush distance, a capability to detect a pedestrian at impact may be improved and/or increased when an impact sensor is at or near the leading edge of the vehicle, such as the vehicle's front or rear bumper cover (depending on the direction of vehicle movement). Typically, the leading edge of a vehicle comprises a fascia made up of a material which may be thin and include aesthetic design concerns. The aesthetic design concerns may limit and/or prevent usage of conventional fasteners which require piercing the front fascia, or fasteners which may deform the A-surface corresponding to the attachment location. The design constraints, performance requirements and aesthetic concerns mentioned above create multiple challenges for mounting sensors, such as pedestrian protection sensors, to a desired B-surface of a vehicle bumper cover and/or fascia.

FIGS. 3 through 8 show an illustrative pedestrian sensor assembly 100 positioned on a bumper cover or fascia for an automotive vehicle. The sensor assembly 100 may include a sensor 102, a sensor housing 104 and a planar tab 106. Examples of a sensor 102 include but are not limited to acceleration sensors and/or pressure sensors. The tab 106 may be embedded into the sensor assembly 100 and may further be bonded to a fascia B-surface 108 of a fascia bumper cover 109. Two examples of bonding methods may include ultrasonic welding and adhesive bonding. The tab 106 may preferably have a thickness between one and three millimeters to facilitate a desired ultrasonic weld. An ultrasonic weld utilizing the tab 106 with a thickness above three millimeters may result in a dimple or other deformation to an A-surface 107 of the bumper cover 109. An ultrasonic weld utilizing the tab 106 with a thickness below one millimeter may not be strong enough to hold the sensor assembly 100 to the B-surface 108. If ultrasonic welding is utilized, the tab 106 may be bonded to B-surface 108 at weld spots 113. The tab 106 may be, without limitation, a plastic strip or a material the same as a material used for the corresponding bumper cover. The distance between the B-surface 108 and sensor assembly 100 may be less than or equal to a desired tab 106 thickness. Additionally and/or optionally, the tab 106 may be an extension of the sensor housing 104.

As such and in contrast to the sensor assemblies in FIGS. 1 and 2, the sensor assembly 100 may be positioned substantially on the B-surface 108 without mechanical fasteners, such as a stud, thereby minimizing the fore-aft space occupied by the sensor assembly 100 and resulting in a greater crush distance shown as dimension 111. This configuration for sensor assembly 100 may further minimize the number of vehicle components and/or elements within an area 110. A preferred length for dimension 111 may be equal to or greater than seventy millimeters, though the length of dimension 111 may vary in accordance with the sensor assembly 100 thickness and tab 106 thickness. Each additional unit of measure added to the crush distance, in this case dimension 111, may provide additional pedestrian safety benefits. More space between the bumper beam 112 and an exemplary point of impact at the bumper cover 109 may provide, for example and without limitation, (i) more time for a vehicle safety system to receive, process and respond to a detection signal from sensor 102 following impact; and (ii) a larger cavity and/or space, such as area 110, to operate as a crumple zone to assist in reducing injury to the pedestrian following impact.

The sensor assembly 100 may further provide advantages with regard to operator assembly in a line and/or sub-assembly environment. Examples of bracket mounting methods at present may include snapping, adhering and welding to a vehicle fascia. Some sensors, such as parking aid sensors, may require a hole or holes in the fascia to attach the sensor bracket(s) either before or after the fascias are painted. Other sensors, such as those used in pedestrian sensing systems, may not require a hole through a fascia but may include multiple other steps for both assembly and attachment. The sensor assembly 100 may provide cost savings by reducing the number of operator steps involved in mounting sensor assemblies to vehicle bumper covers. For example and now referring again to FIG. 1, mounting sensor assembly 2 to B-surface 8 may require one or more operators and multiple steps including: (i) attach stud 12 to bracket 10; (ii) attach sensor 14 to bracket 10 (iii) heat stake or weld sensor assembly 2 to the B-surface. In contrast and referring again to FIG.

3, mounting sensor assembly 100 to B-surface 108 may include bonding the sensor assembly 100 to the B-surface 108 at a desired bonding location.

The sensor assembly 100 bonding location on the B-surface 108 may also influence performance of a pedestrian protection system. For example, a desired functionality of the sensor 102 may be to identify and/or determine a type of object at impact. Object characteristics, such as but not limited to density and weight, may vary between different types of objects and influence the effect of the impact. (A vehicle to tree collision, for example, may have a different impact effect on a vehicle than a vehicle to pedestrian collision.) A sensor system safety feature with a capability to identify and/or determine the type of object at impact and activate a response based on the determining may assist in reducing damage to the vehicle and/or object. The sensor system safety feature may determine that a density of an object at impact is below a predetermined threshold and as such, activate the vehicle response to reduce the vehicle force impacting the object.

For example, if a vehicle to pedestrian impact is at the bumper cover 109 of a vehicle and the system safety feature receives a detection signal from sensor 102 indicating the pedestrian has a density below or above a predetermined threshold, the safety feature may direct the vehicle's hood to "pop," or may direct deployment of an energy absorbing hood panel to reduce an amount of force transferred from the vehicle to the pedestrian. This effect is similar to a crumple-zone and may be increasingly effective with greater crush distances. It may therefore be advantageous to position the sensor 102 and/or sensor assembly 100 at or near a potential impact zone on a vehicle to promote detection upon impact.

Figure 4:
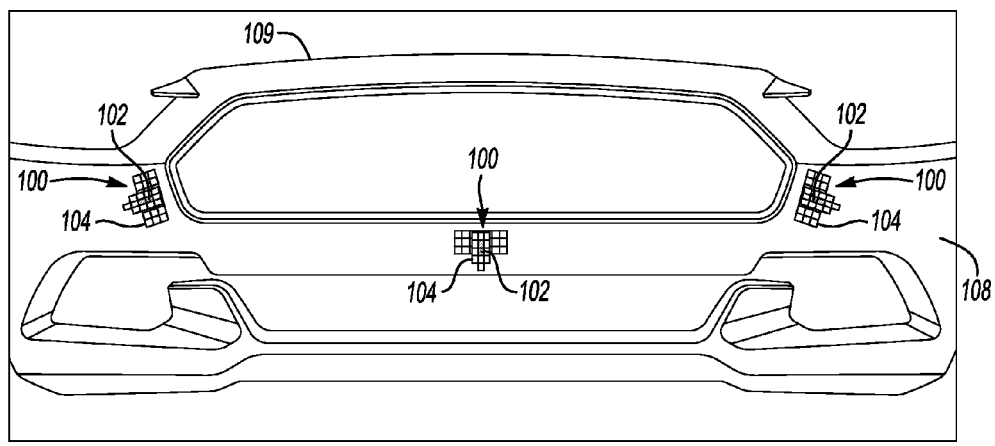
FIG. 4 is a rear view of three sensor assemblies attached to a bumper cover.
Figure 5:
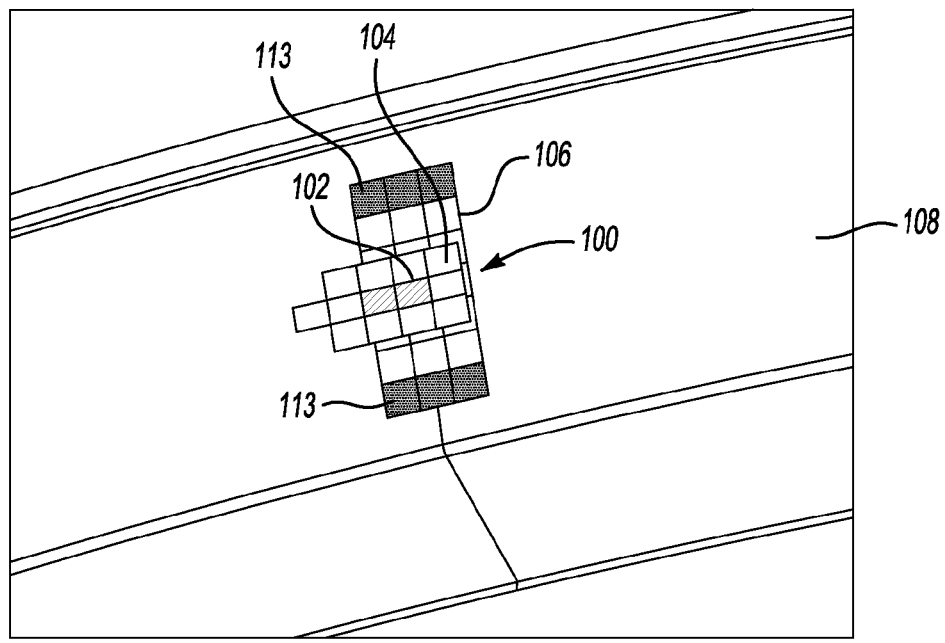
FIG. 5 is a perspective view of one of the sensor assemblies of FIG. 4.
Figure 6:
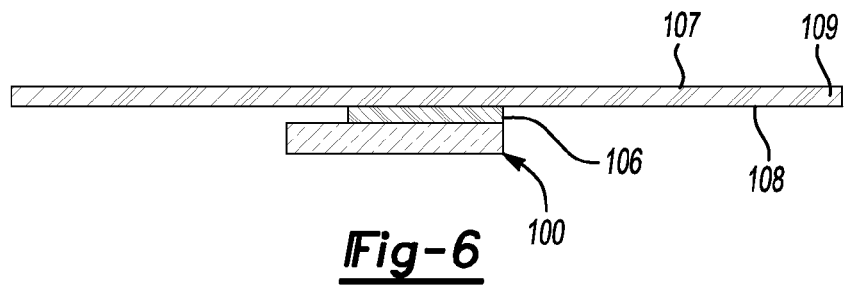
FIGS. 6 and 8 are side views, in cross-section, of sensor assemblies attached to bumper covers.
Figure 7:
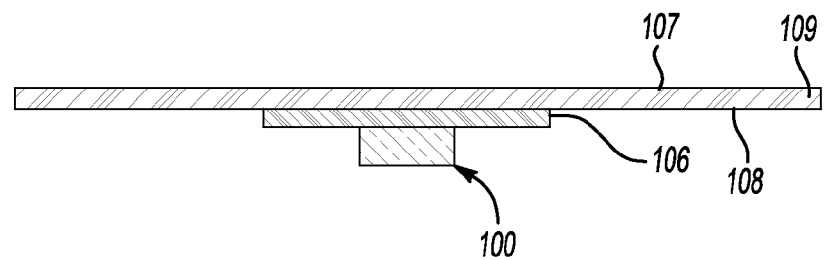
FIGS. 7 and 9 are side views, in cross-section, of planar tabs attached to bumper covers.

Further, utilizing multiple sensor assemblies 100 may also improve and/or increase the capability to detect an object at impact. FIG. 4 shows an illustrative configuration for a group of sensor assemblies 100. Each sensor assembly 100 may be positioned in an area and/or zone on a vehicle fascia where an impact is most likely to occur and/or most often occurs.

Figure 8:
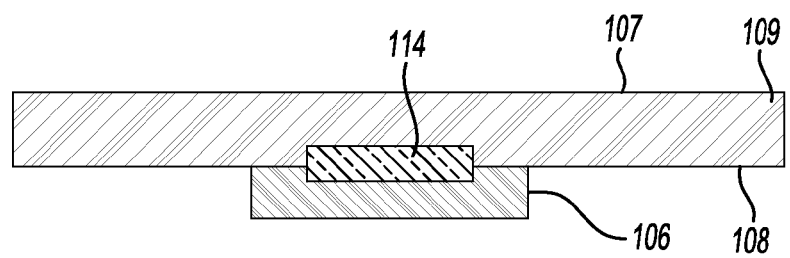
Figure 9:
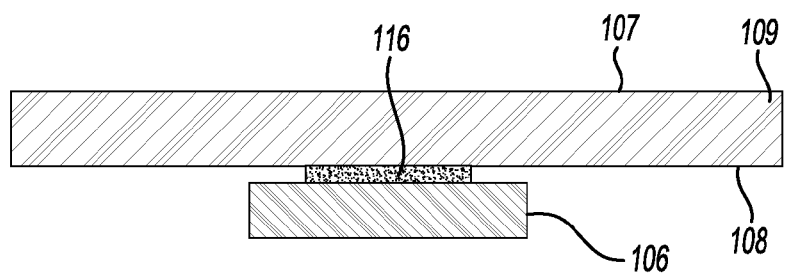

Referring now to FIGS. 8 and 9, two exemplary joining methods may be utilized to mount the sensor assembly 100 to the bumper cover 109 as referenced above. FIG. 8 shows an exemplary joining method in which ultrasonic welding may create a localized fusion 114 of material from both the bumper cover 109 and the tab 106. FIG. 9 shows an exemplary joining method in which adhesive bonding may utilize a stable adhesive material 116 to bond the bumper cover 109 and tab 106. Both methods may provide an opportunity to bond the tab 106 to the B-surface 108 without having any read through and/or deformation to the A-surface 107.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a bumper beam;
   a bumper cover; and
   an impact sensor assembly (i) disposed between the bumper beam and bumper cover and (ii) including a housing secured to the bumper cover, without mechanically fastening, via a planar tab, and an impact sensor disposed within the housing, wherein the planar tab is located between the impact sensor and bumper cover and bonded to the bumper cover, and wherein the assembly is arranged such that the distance between the bumper beam and the assembly is at least seventy millimeters.

2. The vehicle of claim 1 wherein the planar tab is a plastic strip.

3. The vehicle of claim 1 wherein the planar tab is embedded within the housing.

4. The vehicle of claim 1 wherein the planar tab extends from the housing.

5. The vehicle of claim 1 wherein the planar tab is adhesively bonded to the bumper cover.

6. The vehicle of claim 1 wherein the planar tab is ultrasonically welded to the bumper cover.

7. The vehicle of claim 1 wherein the planar tab is between one and three millimeters thick.

8. The vehicle of claim 1 wherein the planar tab is of a material that is the same as a material of the bumper cover.

9. A vehicle fascia assembly comprising:
   a bumper cover; and
   an impact sensor assembly including a housing attached to the bumper cover, without mechanically fastening, via an ultrasonically welded planar tab, and a sensor disposed within the housing, wherein the housing is spaced away from the bumper cover a distance no greater than a thickness of the planar tab, and wherein the planar tab is located between the bumper cover and sensor.

10. The assembly of claim 9 wherein the planar tab is a plastic strip.

11. The assembly of claim 9 wherein the planar tab is embedded within the housing.

12. The assembly of claim 9 wherein the planar tab extends from the housing.

13. The vehicle of claim 9 wherein the planar tab is between one and three millimeters thick.

14. The vehicle of claim 9 wherein the planar tab is of a material that is the same as a material of the bumper cover.

15. A vehicle comprising:
   a bumper beam;
   a bumper cover with an inner surface and an outer surface, the bumper beam and inner surface at least partially defining a cavity; and
   a sensor assembly disposed within the cavity and including a sensor, a housing attached to the inner surface, without mechanically fastening, via a planar tab, wherein the planar tab is located between the inner surface and sensor and has a thickness such that when ultrasonically welded to the inner surface, the planar tab does not cause deformation of the outer surface of the bumper cover proximate to the planar tab.

16. The vehicle of claim 15 wherein the planar tab is a plastic strip.

17. The vehicle of claim 15 wherein the planar tab is embedded within the housing.

18. The vehicle of claim 15 wherein the planar tab extends from the housing.

19. The vehicle of claim 15 wherein the planar tab is of a material that is the same as a material of the bumper cover.

\* \* \* \* \*